(12) United States Patent
Little et al.

(10) Patent No.: US 8,944,830 B2
(45) Date of Patent: Feb. 3, 2015

(54) CONNECTOR WITH DIFFERENTLY ARRANGED CONTACT MOUNTING PORTIONS AND CONNECTOR ASSEMBLY HAVE TWO SUCH CONNECTORS BELLY-TO-BELLY MOUNTED TO A CIRCUIT BOARD

(71) Applicant: Hon Hai Precision Industry Co., Ltd., New Taipei (TW)

(72) Inventors: Terrance F. Little, Fullerton, CA (US); Yuan-Chieh Lin, Lake Forest, CA (US); Jun-Bin Huang, Eastvale, CA (US); Gang Paul Chen, Walnut, CA (US); Jie Zheng, Rowland-Heights, CA (US); An-Jen Yang, Irvine, CA (US); Jim Zhao, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 66 days.

(21) Appl. No.: 13/904,260

(22) Filed: May 29, 2013

(65) Prior Publication Data

US 2014/0357103 A1 Dec. 4, 2014

(51) Int. Cl.
*H01R 12/00* (2006.01)
*H01R 12/58* (2011.01)

(52) U.S. Cl.
CPC ..................................... *H01R 12/58* (2013.01)

USPC ........................................................ 439/79

(58) Field of Classification Search
USPC .................................... 439/79, 83, 637, 540.1
See application file for complete search history.

(56) References Cited

U.S. PATENT DOCUMENTS

| | | | | |
|---|---|---|---|---|
| 4,836,791 A | * | 6/1989 | Grabbe et al. | 439/79 |
| 4,909,743 A | * | 3/1990 | Johnson et al. | 439/60 |
| 6,443,768 B1 | | 9/2002 | Dirkers et al. | |
| 7,442,055 B2 | * | 10/2008 | Robinette | 439/79 |
| 2012/0040566 A1 | | 2/2012 | Wang et al. | |

* cited by examiner

*Primary Examiner* — Phuong Dinh
(74) *Attorney, Agent, or Firm* — Ming Chieh Chang; Wei Te Chung

(57) ABSTRACT

A high speed card edge connector (20, 30) includes an insulative housing (21, 31), and a number of first, second, third, and fourth contacts (221-224) received in the insulative housing and arranged in a number of first columns (25) and a number of second columns (26). Each of the first columns includes one first, one second, and one third contacts. Each of the second columns includes one first, one fourth, and one third contacts. Each of the first to the fourth contacts includes a mounting portion (22b). The mounting portions of the second and the fourth contacts are designed as penetration type termination, and the mounting portions of the first and the third contacts are designed as surface mounted type termination. The mounting portions of the second and the fourth contacts are arranged in different rows.

15 Claims, 13 Drawing Sheets

US 8,944,830 B2

CONNECTOR WITH DIFFERENTLY ARRANGED CONTACT MOUNTING PORTIONS AND CONNECTOR ASSEMBLY HAVE TWO SUCH CONNECTORS BELLY-TO-BELLY MOUNTED TO A CIRCUIT BOARD

BACKGROUND OF THE INVENTION

1. Field of the Invention

The present invention relates to a high speed card edge connector and a connector assembly, and more particularly to a high speed card edge connector having differently arranged contact mounting portions and a connector assembly including two such connectors mounted to two opposite surfaces of a printed circuit board.

2. Description of Related Arts

U.S. Patent Application Publication No. 20120040566, published on Feb. 16, 2012, to Wang et al., discloses a high speed card edge connector. The connector comprises an insulative housing, a plurality of first type of wafers received in the insulative housing, and a plurality of second type of wafers received in the insulative housing. The first and the second wafers are arranged in a manner that one first wafer alternates with two second wafers. Each of the first wafers comprises a first contact and a second contact, and each of the second wafers comprises a first contact, a second contact, and a third contact disposed between the first and the second contacts. Each of the first, the second, and the third contacts comprises a mounting portion, a mating portion, and a connecting portion connecting therebetween. The mounting portions of the first and the third contacts are designed as press fitted type, and the mounting portions of the second contacts are designed as surface mounted type. The mounting portions of the first contacts are arranged in one row, and the mounting portions of the third contacts are arranged in another different row.

An improved high speed card edge connector is desired.

SUMMARY OF THE INVENTION

An object of the present invention is to provide a high speed card edge connector could save mounting space of an outer print circuit board.

To achieve the above-mentioned object, a high speed card edge connector comprises: an insulative housing defining a mating slot; and a plurality of first, second, third and fourth contacts received in the insulative housing and arranged in a plurality of first columns and a plurality of second columns alternately with the first columns respectively, each of the first columns comprising one first, one second and one third contacts, each of the second columns comprising one first, a fourth and a third contacts; each of the first to the fourth contacts comprising a mating portion for mating with a mating connector, a mounting portion, and a connecting portion connecting between the mating portion and the mounting portion, the mounting portions of the second and the fourth contacts disposed between the mounting portions of the first and the third contacts, the mounting portions of the second and the fourth contacts being designed as penetration type termination, and the mounting portions of the first and the third contacts being designed as surface mounted type termination, the mating portions of the second and the fourth contacts being arranged in a same row, and the mounting portions of the second and the fourth contacts being arranged in different rows.

According to the present invention, the mounting portions of the second contacts and the mounting portions of the fourth contacts are disposed at different rows. Therefore, two high speed card edge connectors can be mounted to a print circuit board with belly to belly configuration to save mounting space.

DETAILED DESCRIPTION OF THE PREFERRED EMBODIMENT

Figure 1:
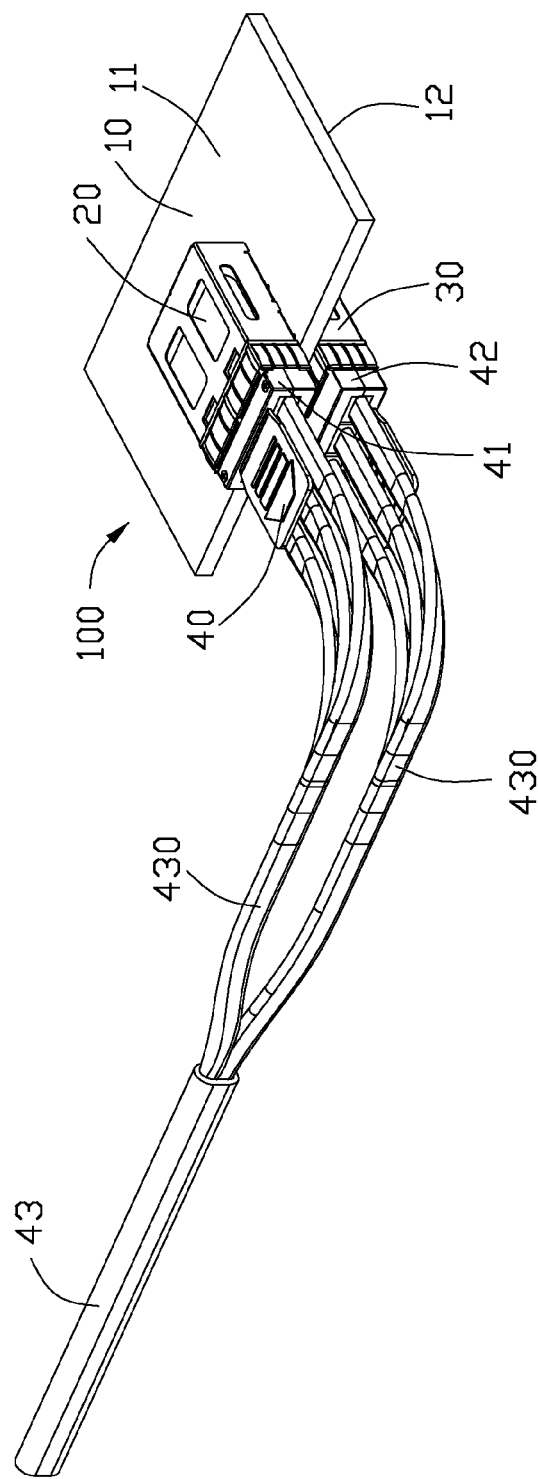
FIG. 1 is perspective view of a mating connector assembly mating with a connector assembly in accordance with a first embodiment of the present invention.
Figure 2:
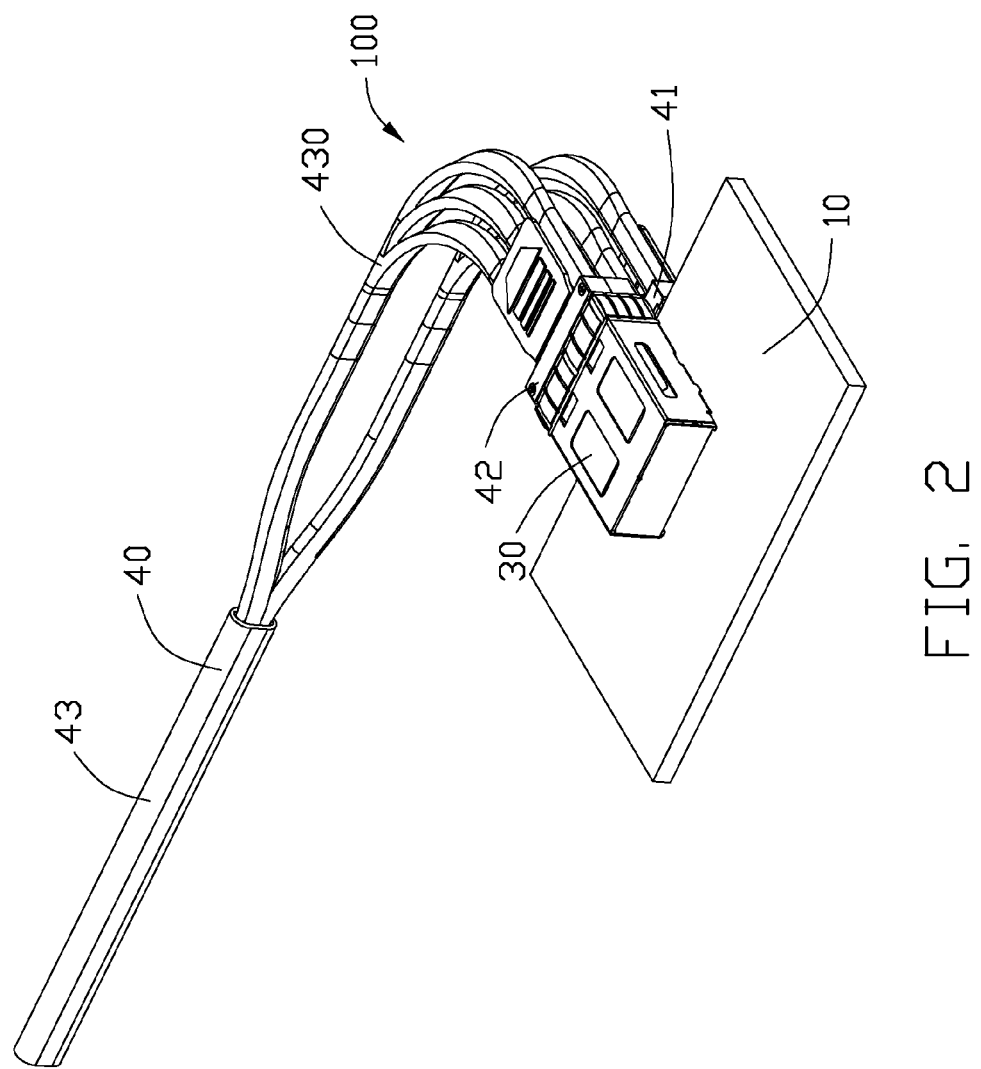
FIG. 2 is another perspective view of the mating connector assembly mating with the connector assembly as shown in FIG. 1.
Figure 3:
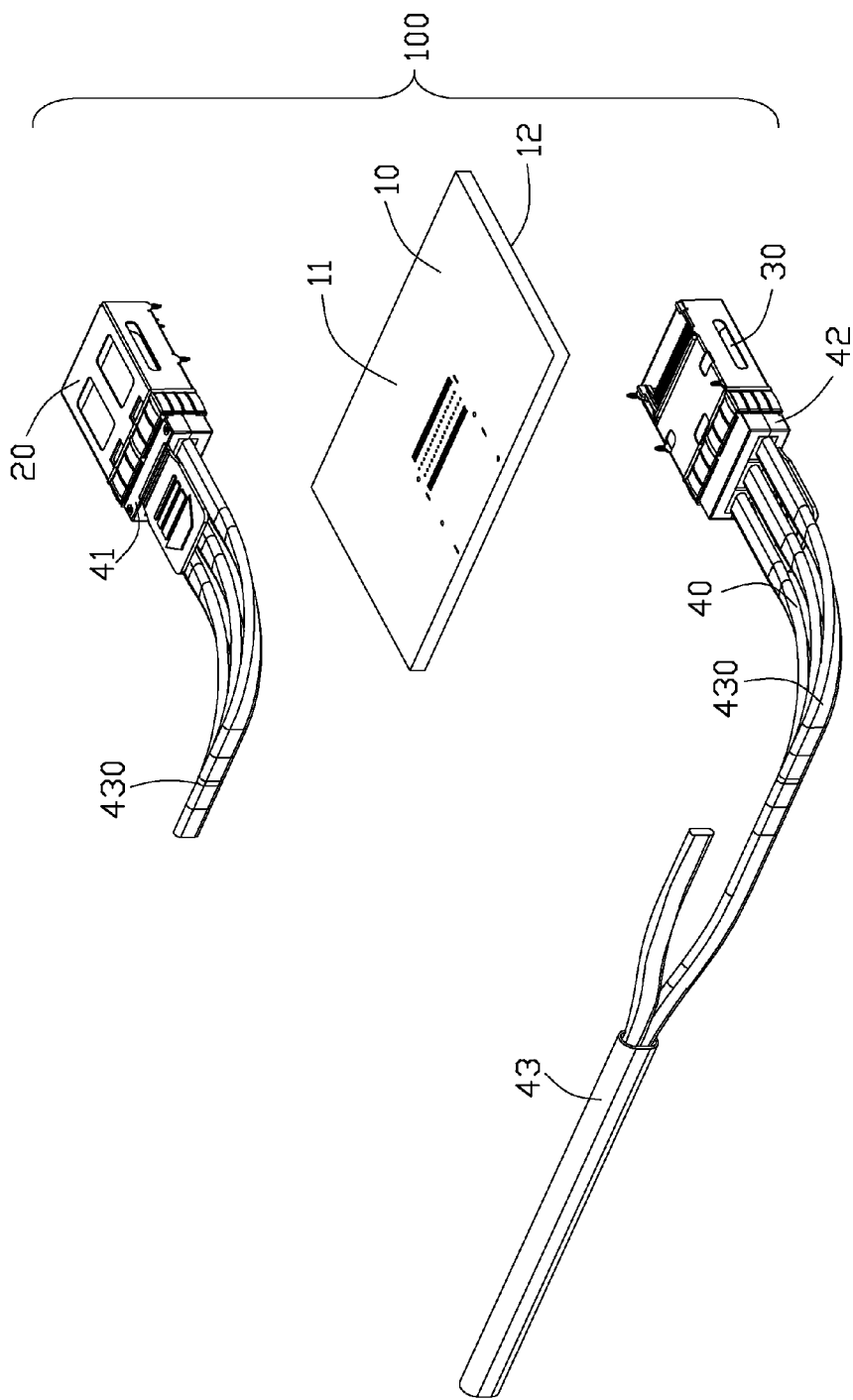
FIG. 3 is a partly exploded view of the mating connector assembly mating with the connector assembly as shown in FIG. 1.
Figure 4:
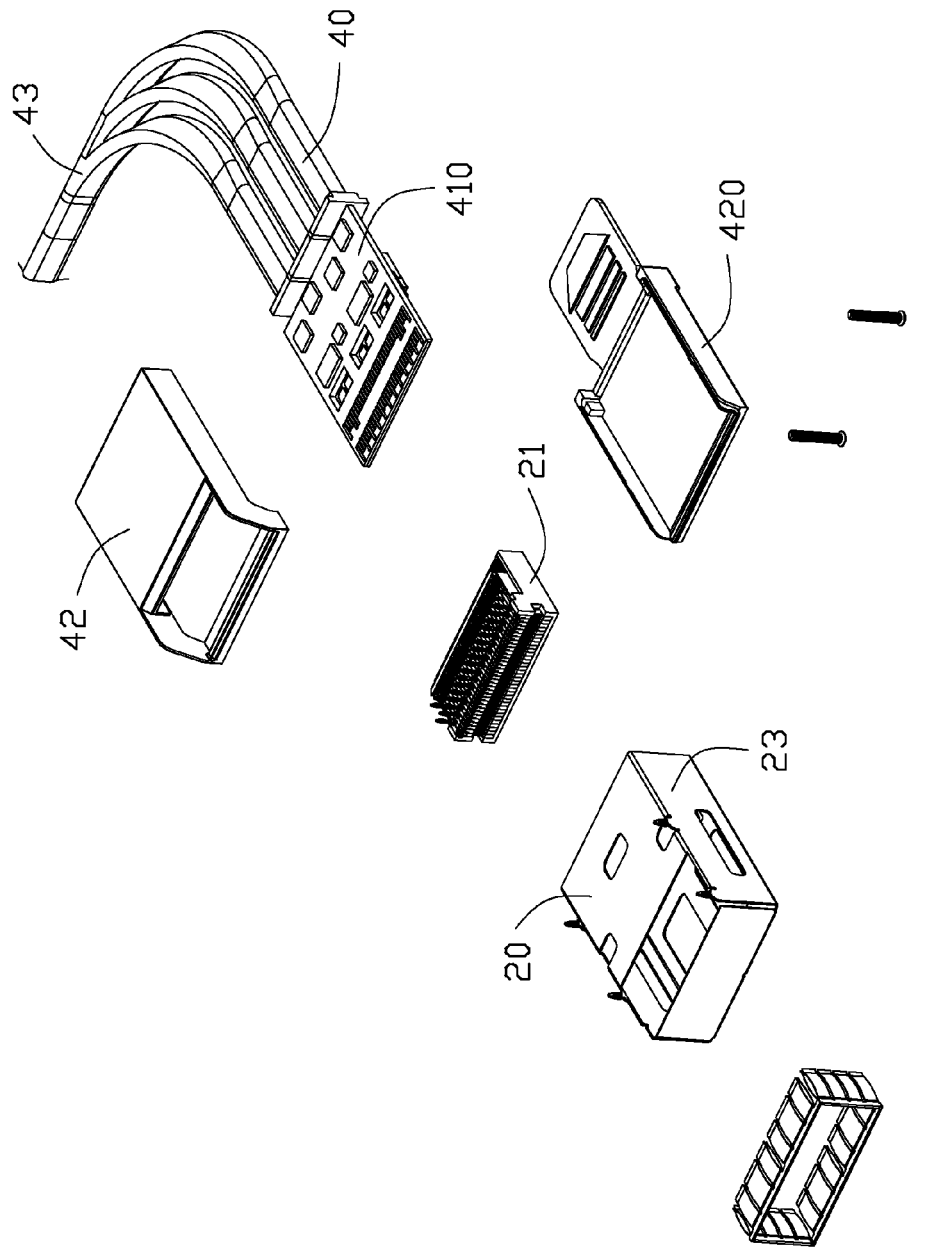
FIG. 4 is a further partly exploded view of the mating connector assembly mating with the connector assembly as shown in FIG. 3.
Figure 5:
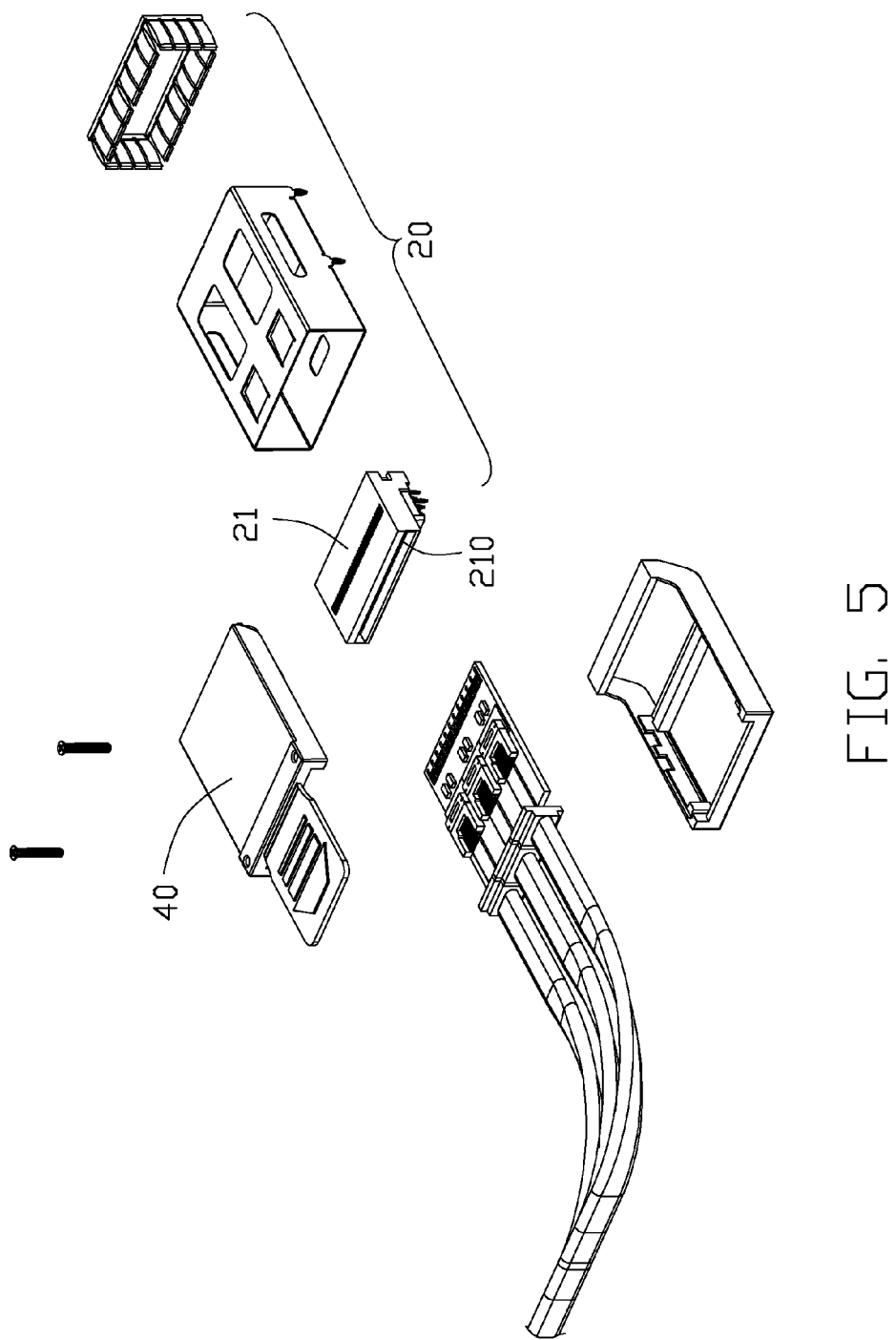
FIG. 5 is another partly exploded view as show in FIG. 4.
Figure 6:
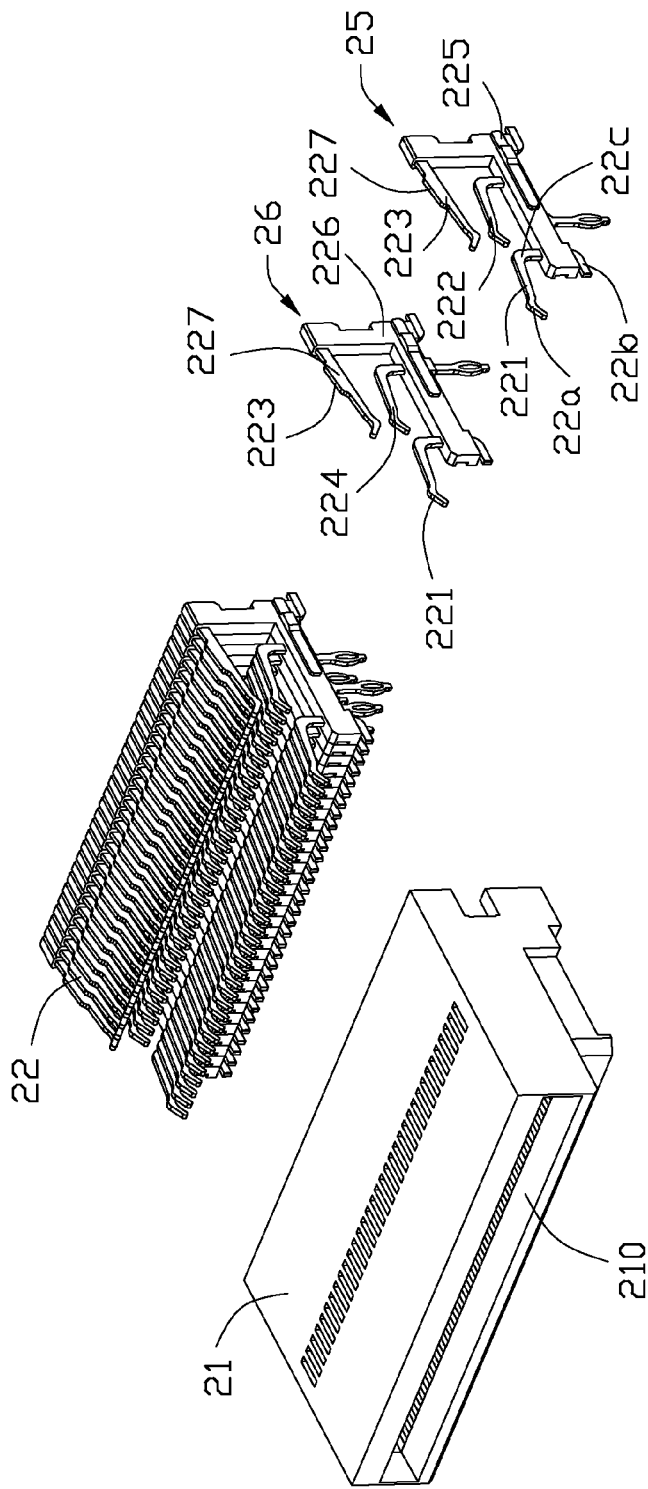
FIG. 6 is an exploded view of the high speed card edge connector as shown in FIG. 1.
Figure 7:
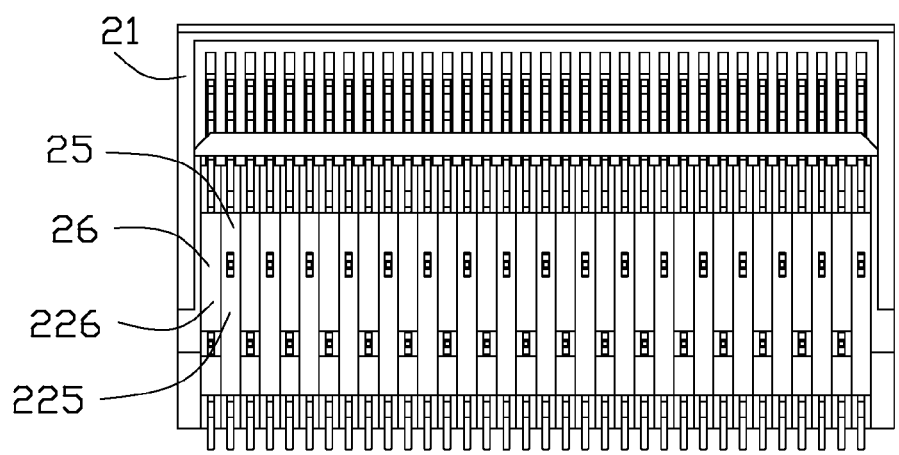
FIG. 7 is a bottom view of the high speed card edge connector as shown in FIG. 6 with a first arrangement of the columns.
Figure 8:
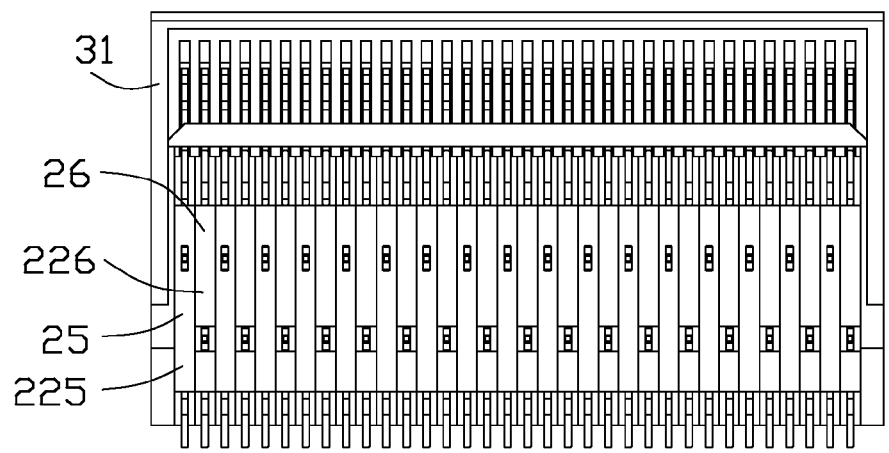
FIG. 8 is a bottom view of the high speed card edge connector as shown in FIG. 6 with a second arrangement of the columns.

Reference will now be made in detail to a preferred embodiment of the present invention.

Referring to FIGS. 1 to 12, a connector system 100 in accordance with a first embodiment of the present invention comprises a print circuit board 10, a first high speed card edge connector 20 mounted to the print circuit board 10, a second high speed card edge connector 30, and a mating connector assembly 40 mating with the first and the second card edge connectors 20, 30. The print circuit board 10 comprises a first surface 11, a second surface 12 opposite to the first surface 11, two rows of first conductive pads 110 disposed at a first surface 11, and two rows of second conductive pads 120 disposed at the second surface 12. The print circuit board 10 defines two rows of mounting holes 13 between the two rows of the first conductive pads 120, and extending through the first surface 11 and the second surface 12.

The first high speed card edge connector 20 comprises an insulative housing 21, a plurality of contacts 22 received in the insulative housing 21, and a metal cover 23 mounted to the first surface 11 of the print circuit board 10 and covering the insulatrive housing 21. The insulative housing 21 defines a mating slot 210 for receiving the mating connector assembly 40. The contacts 22 comprise a plurality of first contacts 221, a plurality of second contacts 222, a plurality of third contacts 223, and a plurality of fourth contacts 224. The contacts 22 are arranged in a plurality of first columns 25 and a plurality of second columns 26 alternately with the first columns 25, respectively. The first and the second columns 25, 26 are inserted into the insulative housing 21 along a back-to-front direction. Each of the first columns 25 comprises one first contact 221, one second contact 222, one third contact 223, and a first insulative housing 225 to fix the first, the second and the third contacts 221, 222, 223. Each of the second columns 26 comprises one first contact 221, one fourth contact 224, one third contact 223, and a second insulative housing 226 to fix the first, the fourth and the third contacts 221, 224, 223. Each of the contacts 22 comprises a mating portion 22a for mating with the mating connector assembly 40, a mounting portion 22b for being mounted to the print circuit board 10, and a connecting portion 22c connecting between the mating portion 22a and the mounting portion 22b. Each of the connecting portions 22c of the third contacts 223 comprises a bump 227 adjacent to the corresponding mating portion 22a to control impedance. The bump 227 has an unusual geometry also strengthen the second contacts 222. The mating portions 22a of the first contacts 221, the second contacts 222 and the fourth contacts 224 are disposed adjacent to a bottom portion of the insulative housing 21, and the mating portions 22a of the third contacts 223 are disposed adjacent to a top portion of the insulative housing 21. A receiving channel 22d is formed by the mating portions 22a of the first to the fourth contacts 221-224 and in communication with the mating slot 210. The mating portions 22a of the first contacts 221 are arranged in a first row and disposed closed to the mating slot. The mating portions 22a of the second and the fourth contacts 222, 224 are disposed in a second row behind the first row. The mating portions 22a of the third contacts 223 are disposed in a third row, and disposed face to face with the mating portion 22a of the second and the fourth contacts 222, 224. The mounting portions 22b of the second and the fourth contacts 222, 224 are disposed between the mounting portions 22b of the first and the third contacts 221, 223. The mounting portions 22b of the first contacts 221 are arranged in a fourth row, the mounting portions 22b of the second contacts 222 arranged in a fifth row, the mounting portions 22b of the third contacts 223 arranged in a sixth row, the mounting portions 22b of the fourth contacts 224 arranged in a seventh row. The fifth row is disposed between the fourth row and the seventh row, and the seventh row is disposed between the fifth row and the sixth row. The mounting portions 22b of the first and the third contacts 221, 223 are designed as surface mounted type termination. The mounting portions 22b of the second and the fourth contacts are designed as penetration type termination, such as compliant pin termination or eye of a needle. The compliant pin termination or eye of a needle Termination will reduce any risk of "cold-soldering" of the center joint where normally it would be a SMT termination in which you cannot physically see or inspect the center SMT termination after soldering process.

Referring to FIGS. 6 to 10, the second high speed card edge connector 30 comprises an insulative housing 31. The difference between the second high speed card edge connector 30 and the first high speed card edge connector 20 is the arrangement of the first columns 25 and second columns 26. In this embodiment, the first high speed card edge connector 20 begins with a second column 26 from left to right direction in front view. The second high speed card edge connector 30 begins with a first column 25 from left to right direction in front view.

Figure 9:
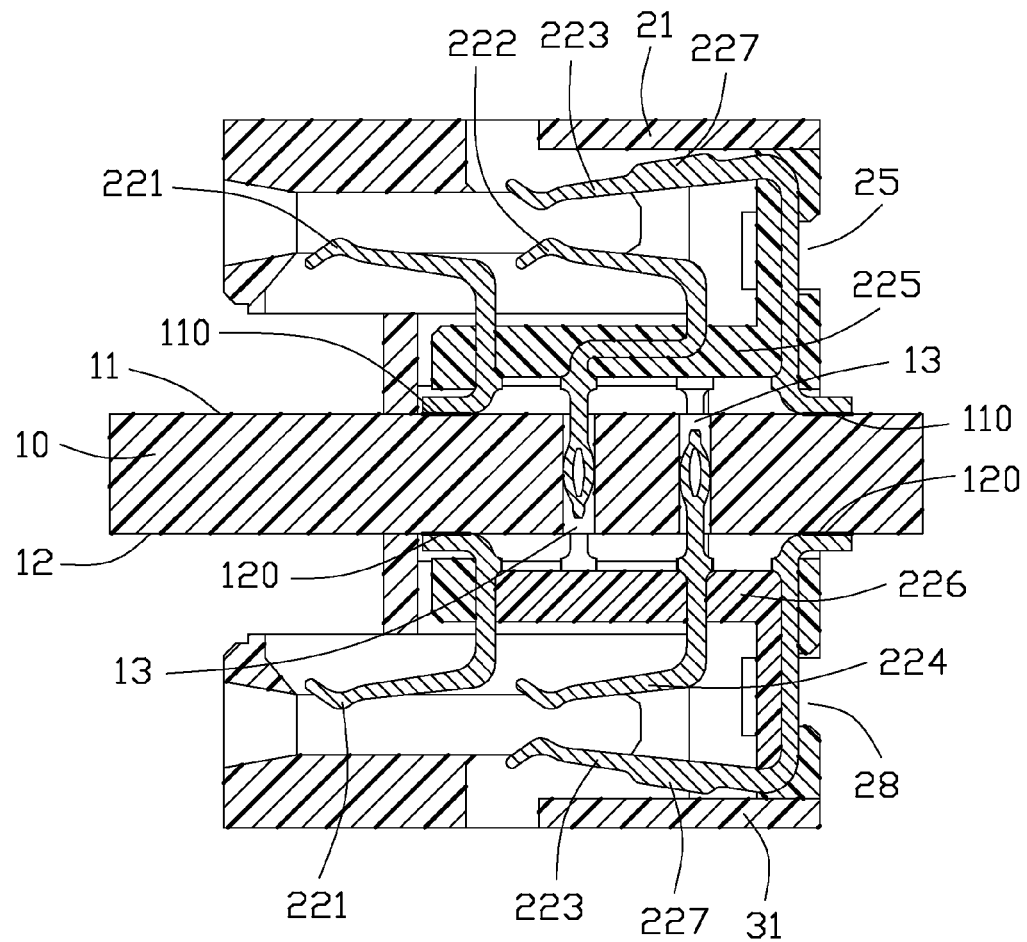
FIG. 9 is a cross-section view of the two high speed card edge connectors mounted to the print circuit board with belly to belly configuration.
Figure 10:
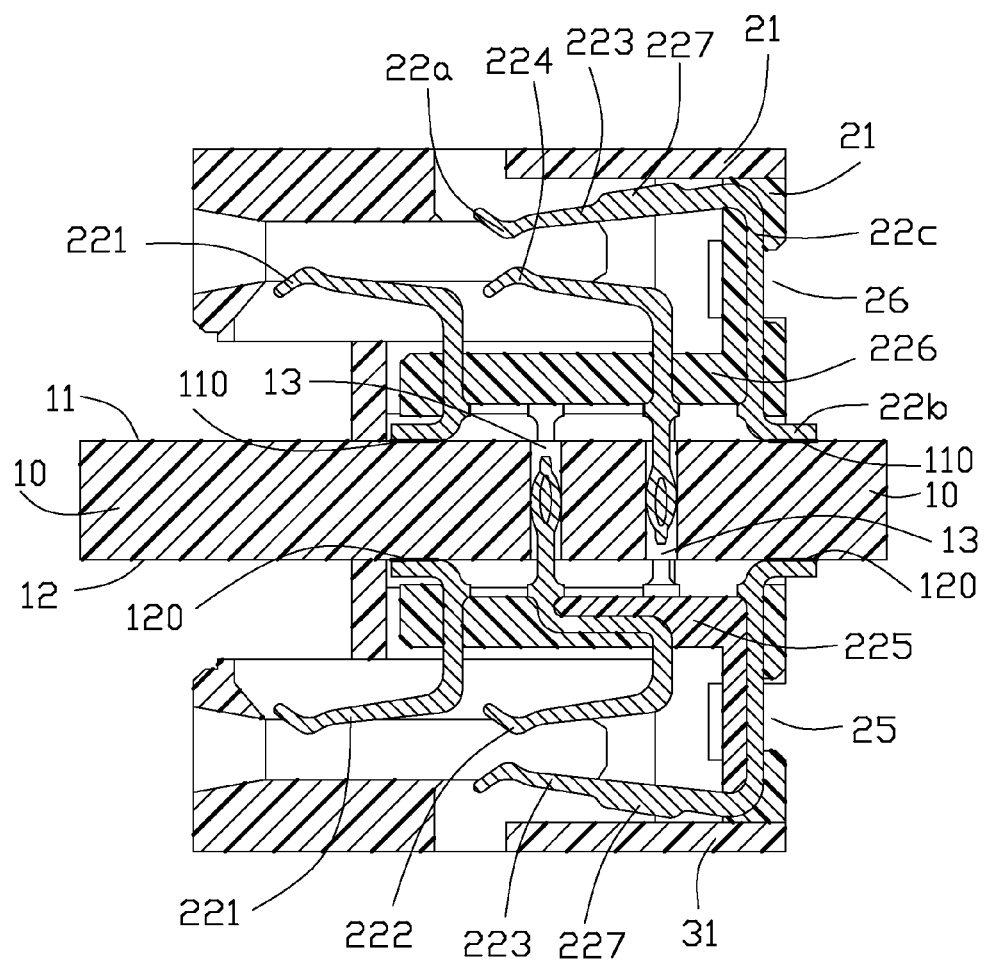
FIG. 10 is another cross-section view of the two high speed card edge connectors mounted to the print circuit board with belly to belly configuration.
Figure 11:
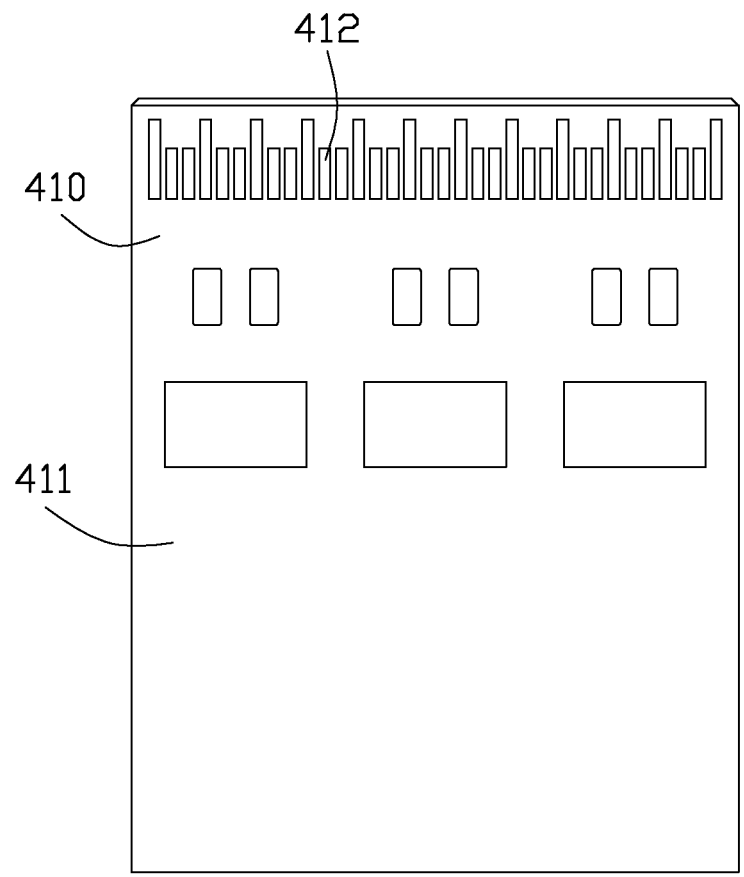
FIG. 11 is a top view of an inner print circuit board of the mating connector assembly as shown in FIG. 1.
Figure 12:
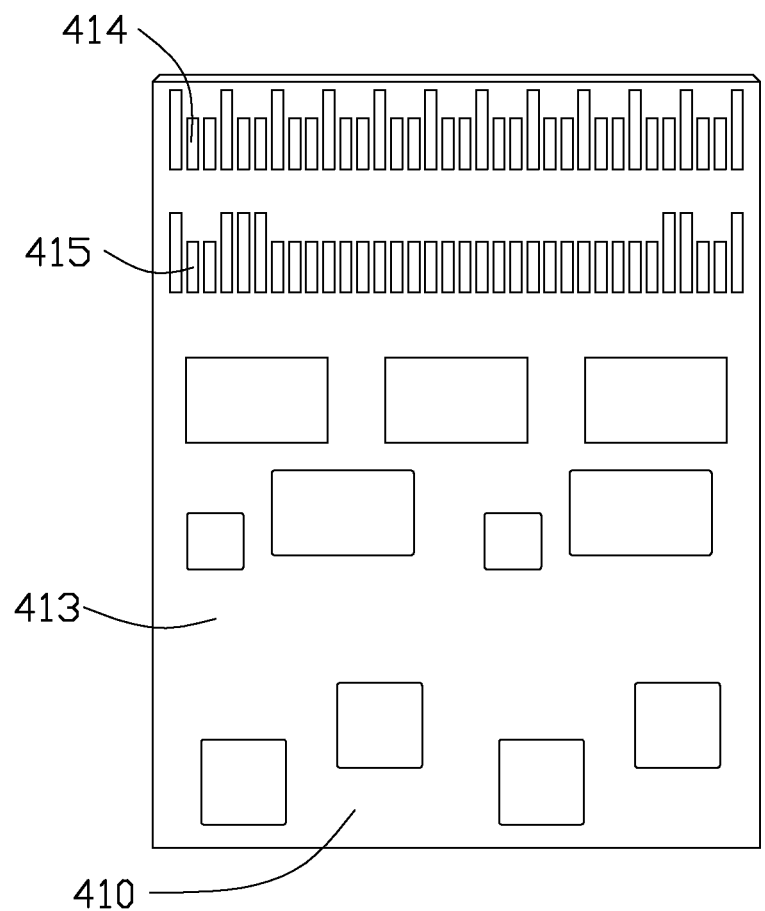
FIG. 12 is a bottom view of an inner print circuit board of the mating connector assembly as shown in FIG. 1.

Referring to FIGS. 9 and 10, the first high speed card edge connector 20 is mounted to the first surface 11 of the print circuit board 10. The mounting portions 22b of the first contacts 221 are surface mounted to one row of the first conductive pads 110, and the mounting portions of the third contacts 223 are surface mounted to the other row of first conductive pads 110, respectively. The mounting portions 22b of the second 222 are alternately inserted into one row of the mounting holes 13, and the fourth contacts 224 are alternately inserted into the other row of mounting holes 13, respectively. The second high speed card edge connector 30 is mounted to the second surface 12 of the print circuit board 10. The mounting portions 22b of the first contacts 221 are surface mounted to one row of the second conductive pads 120, and the third contacts 223 are surface mounted to the other row of second conductive pads 120, respectively. The mounting portions of the second contacts 222 are alternately inserted into the reminder of the one row of the mounting holes 13, and the fourth contacts 224 are alternately inserted into the reminder of the other one row of the mounting holes 13, respectively. Therefore, the first high speed card edge connector 20 and the second high speed card edge connector 30 are allowed belly to belly mounting configuration on the print circuit board 10. The first high speed card edge connector 10 is aligned with the second high speed card edge connector 20. The mounting portions 22b of the second and the fourth contacts 222, 224 are penetrated to approximately ⅓ of the depth of the mounting holes, respectively. Therefore, the mounting portions 22b of the first and the third contacts have a good contact with the first or the second conductive pads 110, 120.

Referring to FIGS. 1 to 5, 11 and 12, the mating connector assembly 40 comprises a first mating connector 41 mating with the first high speed card edge connector 20, a second mating connector 42 mating with the second high speed card edge connector 30, and a optical cable 43 comprising a plurality of optical wires 430 optically connecting with the first and the second mating connectors 41, 42. Both of the first and the second mating connectors 41, 42 comprises a inner print circuit board 410, and a outer meter shell 420 enclosing the inner print circuit board 410. Both of the inner circuit board 410 comprises a first surface 411, a row of first pads 412 disposed on the first surface 411, a second surface 413 opposite to the first surface 411, and a row of second and a row of third pads 414, 415 disposed on the second surface 413. The first pads 412 are used for mating with the mating portions 22a of the third contacts 223 of the first or the second high speed card edge connectors 20, 30. The second pads 414 are used for mating with the mating portions 22a of the second and the fourth contacts 222, 224 of the first or the second high speed card edge connectors 20, 30. The third pads are used for mating with the mating portions 22a of the first contacts 221 of the first or the second high speed card edge connectors 20, 30.

Figure 13:
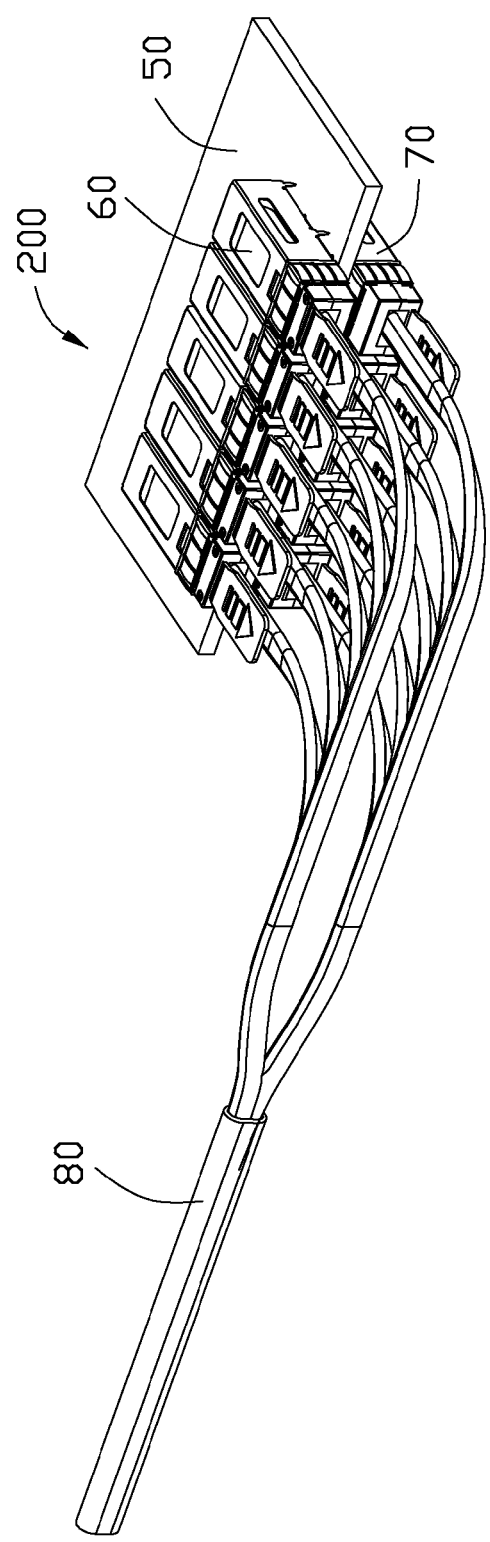
FIG. 13 is perspective view of a mating connector assembly mating with a connector assembly in accordance with a second embodiment of the present invention.

Referring to FIG. 13, a connector system 200 in accordance with a second embodiment of the present invention comprises a print circuit board 50, a plurality of first high speed card edge connectors 60 mounted to a side of the print circuit board 50, and a plurality of second high speed card edge connectors 70 mounted to an opposite side of the print circuit board 50, and a mating connector assembly 80 mating with the first and the second high speed card edge connectors 60, 70. In this embodiment, the connector system has more number of the first and the second high speed card edge connectors 60, 70. But both of the first and the second high speed card edge connectors 60, 70 has less number of first and the second columns 25, 26.

It is to be understood, however, that even though numerous characteristics and advanarmes of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A high speed card edge connector comprising:
   an insulative housing defining a mating slot; and
   a plurality of first, second, third and fourth contacts received in the insulative housing and arranged in a plurality of first columns and a plurality of second columns alternately with the first columns respectively, each of the first columns comprising one first contact, one second contact, and one third contact, each of the second columns comprising one first contact, one fourth contact, and one third contact;
   each of the first to the fourth contacts comprising a mating portion for mating with a mating connector, a mounting portion, and a connecting portion connecting between the mating portion and the mounting portion, the mounting portions of the second and the fourth contacts being disposed between the mounting portions of the first and the third contacts, the mounting portions of the second and the fourth contacts being designed as penetration type termination, and the mounting portions of the first and the third contacts being designed as surface mounted type termination, the mating portions of the second and the fourth contacts being arranged in a same row, and the mounting portions of the second and the fourth contacts being arranged in two different rows.

2. The high speed card edge connector as recited in claim 1, wherein the mating portions of the first, the second, and the fourth contacts are disposed adjacent to a bottom portion of the insulative housing and the mating portions of the third contacts are disposed adjacent to a top portion of the insulative housing with a receiving channel formed therebetween and in communication with the mating slot.

3. The high speed card edge connector as recited in claim 2, wherein the mating portions of the first contacts are arranged in a row and disposed close to the mating slot.

4. The high speed card edge connector as recited in claim 3, wherein the mating potions of the second contacts are arranged in a row and disposed face to face with the mating portion of the second and the fourth contacts.

5. The high speed card edge connector as recited in claim 1, wherein each of the connecting portions of the third contacts comprises a bump adjacent to the corresponding mating portion to control impedance.

6. The high speed card edge connector as recited in claim 1, wherein each of the first columns comprises a first insulative housing to secure the first, the second, and the third contacts, and each of the second columns comprises a second insulative housing to secure the first, the fourth, and the third contacts.

7. The high speed card edge connector as recited in claim 6, wherein the first and the second columns are inserted into the insulative housing along a back-to-front direction.

8. An electrical connector system comprising:
   a printed circuit board defining opposite first and second surfaces thereon in a vertical direction, and first and second rows of tail receiving holes therein wherein each of said first and second rows extends along a transverse direction perpendicular to said vertical direction;
   a first connector and a second connector mounted upon said first and second surfaces, respectively, and arranged in essentially a mirror image manner with each other in said vertical direction;
   the first connector including a plurality of first through hole contacts with first contacting sections extending into a first mating port of the first connector, and with first tails received in the first row of tail receiving holes, respectively;
   the second connector including a plurality of second through contacts with second contacting sections extending into a second mating port of the second connector, and with second tails received in the second rows of tail receiving holes, respectively; wherein
   the first contacting sections and the second contacting sections are arranged in the minor image manner with each other with regard to the printed circuit board for respective confrontation with first and second modules respectively received in the corresponding first and second mating ports in the mirror image manner with each other while said first tails and said second tails are arranged spaced from, aligned and overlapped with each other in a front-to-back direction perpendicular to both said vertical direction and said transverse direction, wherein the first connector further includes a plurality first surface mount contacts and the second connector further includes a plurality of second surface mount contacts, said first surface mount contacts and said second surface mount contacts being arranged in the mirror image manner with each other, wherein both the first through hole contacts and the first surface mount contacts are arranged in pairs each integrated by an insulator as a wafer.

9. The electrical connector system as claimed in claim 8, wherein both said first mating port and said second mating port forwardly communicate with an exterior in said front-to-back direction.

10. An electrical connector assembly comprising:
    a first connector including an upper row of first contacts, a lower row of first contacts and a front row of first contacts space from one another and each of said rows in said first connector extending in a transverse direction, the lower row of first contacts upwardly opposite to the upper row of first contacts in a vertical direction perpendicular to said transverse direction, and the front row of first contacts rearwardly opposite to the lower row of first contacts in a front-to-back direction perpendicular to both the transverse direction and the vertical direction, the upper row of first contacts and the front row of first contacts being of a surface mount type while the lower row of first contacts being a through hole type; and
    a second connector configured and dimension similar to the first connector while in an upside down manner in said vertical direction, said second connector including an upper row of second contacts, a lower row of second contacts and a front row of second contacts spaced from one another and each of said rows in said second connector extending in the transverse direction, the lower row of second contacts upwardly opposite to the upper row of second contacts in said vertical direction, and the front row of second contacts rearwardly opposite to the lower row of second contacts in said front-to-back direc tion, the upper row of second contacts and the front row of second contacts being of a surface mount type; wherein tails of the upper row of first contacts and those of the front row of first contacts are aligned with the corresponding tails of the upper row of the second contacts and those of the front row of second contacts in the vertical direction, respectively, while tails of the lower row of first contacts are offset from and overlapped with those of the lower row of second contacts in the front-to-back direction, wherein opposing lower, upper, and front first contacts being integrated by an insulator as a wafer.

11. The electrical connector assembly as claimed in claim 10, wherein the tails of the upper row of first contacts and those of the front row of first contacts extend opposite to each other, and the tails of the upper row of second contacts and those of the front row of second contacts extend opposite to each other.

12. The electrical connector assembly as claimed in claim 11, wherein the tails of the upper row of first contacts and those of the front row of first contacts extend away from each other, and the tails of the upper row of second contacts and those of the front row of second contacts extend away from each other.

13. The electrical connector assembly as claimed in claim 10, wherein said first connector and said second connector are joined with each other via a printed circuit board sandwiched therebetween.

14. The electrical connector assembly as claimed in claim 10, wherein the printed circuit board defines two rows of insertion holes, and the tails of the lower row of first contacts are arranged in two rows in a staggered manner, and the tails of the lower row of second contacts are arranged in two rows in the staggered manner intermixed with the tails of the lower row of first contacts so as to have the tail of the lower row of first contacts and those of the lower row of second contacts are received in said two rows of insertion holes in the staggered manner.

15. The electrical connector assembly as claimed in claim 10, wherein the upper row of first contacts, the lower row of first contacts and the front row of first contacts are integrated by a plurality of first stacked triplex wafers each unifying one upper row first contact, one lower row first contact and one front row first contacts; the upper row of second contacts, the lower rows of second contacts and the front row of second contacts are integrated by a plurality of second stacked triplex wafers each unifying one upper row second contact, one lower row second contact and one front row second contacts.

* * * * *